UNITED STATES PATENT OFFICE 2,329,699

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application September 8, 1941, Serial No. 410,087

10 Claims. (Cl. 252—341)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc. and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipe line oil.

The new chemical compound or composition of matter used as the demulsified of our herein described process for breaking petroleum emulsions, is exemplified by the acidic, or preferably, neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated for the sake of convenience by the formula T.OH, is reacted with a polybasic carboxy acid, which, similarly, may conveniently be of the dibasic type and indicated by the formula HOOC.D.COOH, then the fractional ester obtained by reaction between equimolar quantities may be indicated by the following formula:

HOOC.D.COO.T

The polyethylene glycol may be characterized by materials of the kind such as heptaethylene glycol, octaethylene glycol, nonaethylene glycol, decaethylene glycol, to and including heptadecaethylene glycol. For convenience, these polyethylene glycols may be indicated by the following formula:

in which $m$ varies from 7 through 17.

Instead of polyethylene glycols, one may use polypropylene glycols or polybutylene glycols. Thus, for convenience, in the broadest aspect, the polyalkylene glycols employed may be indicated by the following formula:

in which $m$ has its previous significance, and $n$ represents a numeral varying from 2 to 4.

Thus, the bulk of the materials herein contemplated for use as demulsifiers, may be indicated within certain variations, as hereinafter stated, by the neutral ester derived by esterification of one mole of a glycol of the kind above described, with two moles of a fractional ester of the kind previously described. The formation of the compound may be indicated by the following reaction, although obviously it is immaterial what particular procedure is employed to produce the particular chemical compound or product:

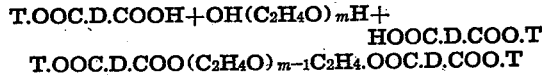

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including, citric, malic, tartaric, and the like. The selection of the particular tribasic or dibasic acid employed is usually concerned, largely, with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on the per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8–12 oxyalkylene groups, particularly 8–12 oxyethylene groups. Our preference to use the oxyethylated compounds is due, largely, to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate fractional ester may then be considered as a dibasic or polybasic acid. One mole of the intermediate fractional ester, so obtained, is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions.

The alcoholic bodies employed as reactants in one mode of manufacture of the present compounds, are hydroxylated high molal amines, preferably of the basic type. Such amines are characterized by containing at least one group having a hydrocarbon radical, which, in turn, has at least 8 carbon atoms and may have as many as 26 carbon atoms, or even more. Such amine is of the hydroxylated type by virtue of the presence of at least one hydroxy hydrocarbon radical, or similar radicals, in which the carbon atom chain is interrupted at least once by an oxygen atom. Such ether linkages in the hydroxylated radical may occur as many as five times. Such hydroxylated high molal amines are obtained by conventional procedure, in which a high molal primary or secondary amine is submitted to the action of an oxy-alkylating agent, such as ethylene oxide, propylene oxide, butylene oxide, glycid, and the like. The oxy-alkylating agents employed are the kind which contain 4 carbon atoms or less in the hydrocarbon radical.

Our preferred oxyalkylating agent is ethylene oxide, due to its availability, comparatively low cost, and its increased reactivity in comparison with other oxyalkylating agents.

As to patents which illustrate the oxyalkylation of high molal amines, reference is made to U. S. Patent No. 2,233,383, dated February 25, 1941, to De Groote and Keiser. See Examples 2, 8 and 14 in said De Groote and Keiser patent. See also U. S. Patent No. 1,970,578, dated August 21, 1934, to Schoeller and Wittwer.

Amines of the kind enumerated which are used as primary reactants for the manufacture of hydroxylated high molal primary or secondary amines, may be produced in various manners. They may be produced from naphthenic acids, resin acids, fatty acids, oxidized petroleum acids, or the like, by converting the acid into the ester, preferably the ethyl ester or the like, and then converting the ester into the alcohol. Such alcohols, derived from various fatty acids, naphthenic acids, oxidized petroleum acids, resin acids, and the like, are available commercially and are employed in the manufacture of wetting agents or the like by sulfating or sulfonating such alcohols. Such high molal alcohols can be converted into the chlorides, and the chlorides reacted with ammonia or a primary or secondary amine to give amines of the type herein contemplated. If derived from higher fatty acids, such as stearic acid, the hydrocarbon chain is simply an alkyl radical. Naturally, if derived from an unsaturated fatty acid, such as oleic acid, the radical would represent an unsaturated hydrocarbon radical. If derived from ricinoleic acid or some other hydroxy acid, such as hydroxystearic acid, one would have a hydroxylated hydrocarbon radical.

In actual practice amines of the kind herein contemplated can be obtained in various ways. Reference is made to a number of patents which discloses or describe such amines, or the method of manufacturing the same. In some cases obvious modifications will be required to produce amines of the find contemplated; but such modifications would be evident to a skilled chemist, without further discussion. See the following patents:

U. S. Patents Nos. 1,951,469, Bertsch, March 20, 1934; 2,006,058, Olin, June 25, 1935; 2,033,866, Schrauth, March 10, 1936; 2,074,380, Flett, March 23, 1937; 2,075,825, Nafash, April 6, 1937; 2,078,922, Arnold, May 4, 1937; 2,091,105, Pigott, August 24, 1937; 2,108,147, Speer, February 15, 1938; 2,110,199, Carothers, March 8, 1938; 2,132,902, Lenher, October 11, 1938; 2,178,522, Ralston, October 31, 1938. British Patent No. 359,001 to Johnson, on behalf of I. G. Farbenindustrie, A. G. 1932, and British Patent No. 358,114, to Carpmael on behalf of I. G. Fargenindustrie, A. G. 1932. See also Industrial & Engineering Chemistry, industrial edition, volume 32, No. 4 (1940), page 486.

In view of what has been said, it will be noted that the group introduced into the amine and derived at least hypothetically from an acid is really the carbon chain radical of the acyl group of the acid or hypothetical acid, along with what was at least hypothetically the carbnyl carbon atom. For the sake of convenience, this radical will be referred to as a hydrocarbon radical; and it is intended to include derivatives in which a hydrogen atom or a small number of hydrogen atoms have been replaced by the hydroxyl radical; for instance, the hydroxy hydrocarbon radical which would be supplied by ricinoleic acid, hydroxystearic acid, dihydroxystearic acid, or the like. In the present instance such usage seems eminently correct, in that the hydrocarbon radical supplies the hydrophobe portion of the amine, and this hydrophobe portion is not changed markedly by the presence of one or two hydroxyl groups, as are present in the case of rininoleic acid, hydroxystearic acid, or the like; and such hydroxyl groups are essentially non-functional, in that they are not relied upon to supply points of chemical activity. They may slightly decrease the hydrophobe character of the radical to some degree; but this cannot be significant, as can be appreciated by reference to ricinoleic acid. Since the carbon atom chain supplied to the amine by means of ricinoleic acid has 18 carbon atoms, it would appear relatively immaterial whether there was present one hydroxyl group or not. Thus, it is to be borne in mind that the use in the hereto appended claims of the word "hydrocarbon" is intended to include the hydroxy-hydrocarbon type of the kind in which the hydroxyl group does not materially reduce the hydrophobe character of the hydrocarbon group, as, for example, the group or radical which would be obtained from ricinoleic acid.

Certain facts are obvious in the preparation of the hydroxylated amines. If a secondary amine is employed as a primary reactant, then obviously, only one hydroxylated radical can be introduced. On the other hand, if a primary amine is employed, then two hydroxylated radicals may be introduced by the use of ethylene oxide or the like. Furthermore, the initial reaction with ethylene oxide or the like does not produce an ether linkage, whereas, subsequent reaction does. Where two high molal groups are present in an amine, they need not be the same. Furthermore, a secondary amine containing one high molal group and one low molal group might be employed. For instance, methyl octylamine, ethyl octylamine, propyl octylamine, methyl decylamine, ethyl decylamine, propyl decylamine, etc. Our preference is to use primary amines as raw materials, rather than secondary amines, and particularly amines which have been derived from carboxy acids. For instance, not the following: Octadecenylamine; cetylamine; stearylamine; oleoamine; ricinoleoamine; amines derived from naphthenic acids; amines derived from octadecadiene 9,11 - acid - 1; octadecylamine; amines derived from mixed unsaturated fatty acids, such as soybean fatty acids; cottonseed oil fatty acids; linseed oil fatty acids; heptadecylamine, hexadecylamine; dodecylamine; decylamine; etc.

Attention is also directed to the fact that suitable amines can be derived from oxidized wax acids. As to the nature of these acids, see U. S. Patent No. 2,242,837, dated May 20, 1941, to Shields. It is well known that certain varieties of such wax acids contain approximately 22–26 carbon atoms, whereas, oxidized acids containing fewer carbon atoms are also available. It is again desirable to note that the high molal hydrocarbon group joined to the amino nitrogen atom may be aliphatic, alicyclic, aryl, or aralkyl in nature, as, for example, hydroxylated amines obtained by the oxyalkylation of naphtrylamine or the like, and substituted naphthylamines, such as alkylated naphthylamines. Attention is directed to the fact that the amines in which there is no aryl group directly joined to the amino nitrogen atom, are comparatively basic in nature, i. e., the type wich has previously been indicated as aliphatic, alicyclic, or aralkyl. It is our preference to use the basic type; i. e., we have found hydroxylated high molal amines in which there is no aryl group directly joined to the amino nitrogen atom, to be the most desirable type of reactant for producing the new composition of matter, particularly when it is employed as a demulsifying agent.

In view of what has been said previously and particularly since the treatment of high molalamines with an oxyalkylating agent is a well knwn procedure, it does not appear necessary to elaborate further on this phase of the manufacturing procedure. However, the following examples are included by way of illustration:

HYDROXYLATED HIGH MOLAL AMINE

*Example 1*

One pound mole of octadecenylamine is treated with two pound moles of ethylene oxide in the conventional manner to give the dihydroxylated compound.

HYDROXYLATED HIGH MOLAL AMINE

*Example 2*

Cetylamine is substituted for octadecenylamine in Example 1, preceding.

HYDROXYLATED HIGH MOLAL AMINE

*Example 3*

Oleoamine is substituted for octadecenylamine in Example 1, preceding.

HYDROXYLATED HIGH MOLAL AMINE

*Example 4*

Ricinoleoamine is substituted for octadecenylamine in Example 1, preceding.

HYDROXYLATED HIGH MOLAL AMINE

*Example 5*

Amine derived from naphthenic acids are substituted for octadecenylamine in Example 1, preceding.

HYDROXYLATED HIGH MOLAL AMINE

Example 6

Octadecylamine is substituted for octadecenylamine in Example 1, preceding.

HYDROXYLATED HIGH MOLAL AMINE

Example 7

Amines derived from mixed unsaturated fatty acids, such as soyabean fatty acids, cottonseed oil fatty acids, teaseed oil fatty acids, etc., are employed instead of octadecenylamine, in Example 7, preceding.

HYDROXYLATED HIGH MOLAL AMINE

Example 8

Amines derived from abietic acid are employed instead of octadecenylamine, in Example 1, preceding.

HYDROXYLATED HIGH MOLAL AMINE

Example 9

Amines derived from oxidized wax acids are employed instead of octadecenylamine in Example 7, preceding.

HYDROXYLATED HIGH MOLAL AMINE

Example 10

The same procedure is followed as in Examples 1-9, preceding, except that 4 moles of ethylene oxide are employed instead of 2 moles.

HYDROXYLATED HIGH MOLAL AMINE

Example 11

The same procedure is followed as in Examples 1-9, preceding, except that 6 moles of ethylene oxide are employed instead of 2 moles.

HYDROXYLATED HIGH MOLAL AMINE

Example 12

The same procedure is followed as in Examples 1-9, preceding, except that 10 moles of ethylene oxide are employed instead of 2 moles.

Having obtained hydroxylated high molal amines of the kind previously described, the next step of course is to obtain fractional esters derived from nonaethylene glycol of the kind described earlier in the present invention. Such fractional esters may be illustrated by the following:

GLYCOL ESTER INTERMEDIATE PRODUCT

Example 1

One pound mole of nonaethylene glycol is reacted with two pound moles of maleic anhydride, so as to form nonaethylene glycol dihydrogen dimaleate.

GLYCOL ESTER INTERMEDIATE PRODUCT

Example 2

A mixture of lower non-distillable polyethylene glycols, representing approximately deca- to tetradecaethylene glycol, is substituted for nonaethylene glycol in the preceding example.

GLYCOL ESTER INTERMEDIATE PRODUCT

Example 3

A 50-50 mixture of nonaethylene glycol and lower nondistillable polyethylene glycols of the kind described in the previous example is substituted for nonaethylene glycol in Example 1.

GLYCOL ESTER INTERMEDIATE PRODUCT

Example 4

Adipic acid is substituted for maleic anhydride in Examples 1-3, preceding.

GLYCOL ESTER INTERMEDIATE PRODUCT

Example 5

Oxalic acid is substituted for maleic anhydride in Examples 1-3, preceding.

GLYCOL ESTER INTERMEDIATE PRODUCT

Example 6

Citric acid is substituted for maleic anhydride in Examples 1-3, preceding.

GLYCOL ESTER INTERMEDIATE PRODUCT

Example 7

Succinic anhydride is substituted for maleic anhydride in Examples 1-3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen, or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. See U. S. Patent No. 2,075,107, dated March 30, 1937, to Frasier.

Sometimes esterification is conducted most readily in the presence of an inert solvent, that carries away the water of esterification which may be formed, although, as is readily appreciated, such water of esterification is absent when the reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well known procedure and requires no further elaboration.

COMPOSITION OF MATTER

Example 1

Two pound moles of a hydroxylated material of the kind exemplified by "Hydroxylated high molal amine, Example 1" are reacted with one pound mole of a glycol ester intermediate product of the kind described under Glycol ester intermediate product, Examples 1, 2 and 3, preceding. Such reaction is conducted until substantially all carboxyl acidity has disappeared. The time of reaction may vary from a few hours to as many as 20 hours.

COMPOSITION OF MATTER

Example 2

The same procedure is followed as in Composition of matter, Example 1, except that one employs a hydroxylated intermediate product described under Hydroxylated high molal amine, Example 2, preceding, instead of in Example 1.

COMPOSITION OF MATTER

Example 3

The same procedure is followed as in Composition of matter, Example 1, except that one employs a hydroxylated intermediate product described under Hydroxylated high molal amine, Example 3, preceding, instead of in Example 1.

COMPOSITION OF MATTER

Example 4

The same procedure is followed as in Composition of matter, Example 1, except that one employs a hydroxylated intermediate product described under Hydroxylated high molal amine, Example 4, preceding.

COMPOSITION OF MATTER

Example 5

The same procedure is followed as in Composition of matter, Example 1, except that one employs a hydroxylated intermediate product described under Hydroxylated high molal amine, Example 5, preceding.

COMPOSITION OF MATTER

Example 6

The same procedure is followed as in Composition of matter, Example 1, except that one employs a hydroxylated intermediate product described under Hydroxylated high molal amine, Example 6, preceding.

COMPOSITION OF MATTER

Example 7

The same procedure is followed as in Composition of matter, Example 1, except that one employs a hydroxylated intermediate product described under Hydroxylated high molal amine, Example 7, preceding.

COMPOSITION OF MATTER

Example 8

The same procedure is followed as in Composition of matter, Example 1, except that one employs a hydroxylated intermediate product described under Hydroxylated high molal amine, Example 8, preceding.

COMPOSITION OF MATTER

Example 9

The same procedure is followed as in Composition of matter, Example 1, except that one employs a hydroxylated intermediate product described under Hydroxylated high molal amine, Example 9, preceding.

COMPOSITION OF MATTER

Example 10

The same procedure is followed as in Composition of matter, Example 1, except that one employs a hydroxylated intermediate product described under Hydroxylated high molal amine, Example 10, preceding.

COMPOSITION OF MATTER

Example 11

The same procedure is followed as in Composition of matter, Example 1, except that one employs a hydroxylated intermediate product described under Hydroxylated high molal amine, Example 11, preceding.

COMPOSITION OF MATTER

Example 12

The same procedure is followed as in Composition of matter, Example 1, except that one employs a hydroxylated intermediate product under Hydroxylated high molal amine, Example 12, preceding.

COMPOSITION OF MATTER

Example 13

The same procedure is followed as in Composition of matter, Examples 1–12, preceding, except that instead of using glycol ester intermediate products exemplified by Glycol ester intermediate product, Examples 1, 2 and 3, preceding, there is employed a product of the kind exemplified by Glycol ester intermediate products 4–7, preceding.

In such previous examples, which include the use of ricinoleic acid, attention is directed to the fact that excellent products of unusual value are obtainable by substituting oxyalkylated ricinoleic acid, particularly oxyethylated ricinoleic acid, in place of ricinoleic acid. The preparation of such material is well known, and preferably involves the following procedure:

Triricinolein, in the form of castor oil, is treated with 3–12 moles of ethylene oxide for each mole of triricinolein. One-half of 1% of sodium stearate or sodium ricinoleate is used as a catalyst. A temperature of 100–200° C. is employed. The reaction is conducted varying from 100 lbs. to 300 lbs. gauge pressure. The water-insoluble oxyethylated triricinolein, so obtained, is saponified so as to yield a water-insoluble oxyethylated ricinoleic acid, or one which, at the most, is self-emulsifying.

Reviewing what has been said, it is obvious that a wide range in carbon atom content exists in regard to the hydroxylated amine. For instance, there may be as few as 10 carbon atoms in the case where one mole of octylamine is treated with one mole of ethylene oxide. On the other hand, where a secondary amine derived from an acyl radical having 26 carbon atoms is treated with 5 moles of ethylene oxide, butylene oxide, or the like, it is obvious that such high molal amine may contain approximately 60–70 carbon atoms.

It is to be noted that this second step is an esterification reaction, and the same procedure is employed as suggested above in the preparation of the intermediate product. Needless to say, any particular method may be used to produce the desired compounds of the kind indicated. In some instances it may be desirable to conduct the esterification reaction in the presence of a non-volatile inert solvent which simply acts as a diluent or viscosity reducer.

In the preceding examples, attention has been directed primarily to the monomeric form, or, at least, to the form in which the bifunctional alcohol, i. e., a glycol, and the polyfunctional acid, usually a bifunctional compound, react to give a chain type compound, in which the adjacent acid and glycol nucleus occur as a structural unit. For instance, in the monomeric form this may be indicated in the following manner:

acid . . . glycol . . . acid

If, however, one prepared an intermediate product employing the ratio of three moles of maleic anhydride and two moles of nonaethylene glycol, the tendency would be to produce a product which might be indicated in the following manner:

acid ... glycol ... acid ... glycol ... acid

Similarly, three moles of the glycol and four moles of the acid might tend to give a combination which may be indicated thus:

acid ... glycol ... acid ...
    glycol ... acid ... glycol ... acid

Another way of stating the matter is that the composition may be indicated in the following manner:

TOOC.D.COO[(C₂H₄O)$_{m-1}$C₂H₄OOC.D.COO]$_x$T in which the characters have their previous significance and $x$ is a relatively small whole number less than 10, and probably less than 5; and in the monomeric form $x$, of course, is 1. The limitations on the size of $x$ are probably influenced, largely, by the fact that reaction leading to further growth, is dependent upon random contact.

Some of the products are self-emulsifiable oils, or self-emulsifiable compounds; whereas, others give cloudy solutions or sols; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid instead of adipic acid; and (d) By using an alcoholic reactant of lower molecular weight, or one having more hydroxyl groups, or possibly, having one or more ether groups.

Indeed, in many instances the hydroxylated body may show some tendency towards water solubility or self-emulsification prior to reaction with a glycol ester. It is to be noted in this instance that the hydroxylated materials which are employed prior to reaction with the glycol ester are largely of the water-soluble type, but in such instances where they are self-emulsifiable or show hydrophobe properties, they are equally suitable.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken, so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by way of any of the various apparatus now generally used to resolve or break petroleum emulsions with a chemical reagent, the above procedure being used either alone, or in combination with other demulsifying procedure, such as the electrical dehydration processes.

The demulsifier herein contemplated may be employed in connection with what is commonly known as down-the-hole procedure, i. e., bringing the demulsifier in contact with the fluids of are well at the bottom of the well, or at some point prior to their emergence. This particular type of application is decidedly feasible when the demulsifier is used in connection with acidification of calcareous oil-bearing strata, especially is suspended in or dissolved in the acid employed for acidification.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously effect the solubility, and in some instances, gives increased resistance, to soluble calcium and magnesium salts, for such property is of particular value. Usually, however, neutralization with a dilute solution of ammonia, or the like, is just as practicable and less expensive.

In the hereto appended claims, it is intended that the monomeric forms contemplate also the polymeric forms, insofar that the polymeric forms are nothing more or less than a repetition of the monomeric forms several times over, with the loss of one or more moles of water.

Having thus described our invention, what we claim as new and desire to secure by Letters Patent is:

1. A process for breaking petroleum emulsions of the water-in-oil type, characterized by subjecting the emulsion to the action of a demulsifying agent, comprising a water-soluble esterification product, derived by reaction between one mole of a polybasic compound and two moles of a hydroxylated high molal amine; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; and said hydroxylated high molal amine having at least one hydrocarbon radical containing at least 8 carbon atoms and not more than 26 carbon atoms, and having at least one hydroxylated aliphatic radical; to the extent that such radical contains ether linkages, such ether linkages shall not exceed five, and the alkylene radical of said aliphatic radical containing not over 4 carbon atoms.

2. A process for breaking petroleum emulsions of the water-in-oil type, characterized by subjecting the emulsion to the action of a demulsifying agent, comprising a neutral, water-soluble esterification product, derived by reaction between one mole of a polybasic compound and two moles of a hydroxylated high molal amine; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; and said hydroxylated high molal amine having at least one hydrocarbon radical containing at least 8 carbon atoms and not more than 26 carbon atoms, and having at least one hydroxylated aliphatic radical; to the extent that such radical contains ether linkages, such ether linkages shall not exceed five, and the alkylene radical of said aliphatic radical containing not over 4 carbon atoms.

3. A process for breaking petroleum emulsions of the water-in-oil type, characterized by subjecting the emulsion to the action of a demulsifying agent, comprising a neutral, water-soluble esterification product, derived by reaction between one mole of a dibasic compound and two moles of a hydroxylated high molal amine; the dibasic compound being the esterification product of (A) a polyalkylene glycol having at least 7 and not more than 17 ether linkages, and the alkylene radical thereof containing at least 2 and not more than 6 carbon atoms; and (B) a dibasic carboxy acid having not more than 6 carbon atoms; and the ratio of the esterifying reactants being within the range of more than 1 and not over 2 moles of the dibasic acid for each mole of the glycol; and said hydroxylated high molal amine having at least one hydrocarbon radical containing at least 8 carbon atoms and not more than 26 carbon atoms, and having at least one hydroxylated aliphatic radical; to the extent that such radical contains ether linkages, such ether linkages shall not exceed five, and the alkylene radical of said aliphatic radical containing not over 4 carbon atoms.

4. A process for breaking petroleum emulsions of the water-in-oil type, characterized by subjecting the emulsion to the action of a demulsifying agent, comprising a neutral, water-soluble esterification product, derived by reaction between one mole of a dibasic compound and two moles of a hydroxylated high molal amine; the dibasic compound being the esterification product of (A) a polyalkylene glycol having at least 7 and not more than 17 ether linkages, and the alkylene radical thereof containing at least 2 and not more than 4 carbon atoms; and (B) a dibasic carboxy acid having not more than 6 carbon atoms; and the ratio of the esterifying reactants being within the range of more than 1 and not over 2 moles of the dibasic acid for each mole of the glycol; and said hydroxylated high molal amine having at least one hydrocarbon radical containing at least 8 carbon atoms and not more than 26 carbon atoms, and having at least one hydroxylated aliphatic radical; to the extent that such radical contains ether linkages, such ether linkages shall not exceed five, and the alkylene radical of said aliphatic radical containing not over 4 carbon atoms.

5. A process for breaking petroleum emulsions of the water-in-oil type, characterized by subjecting the emulsion to the action of a demulsifying agent, comprising a neutral, water-soluble esterification product, derived by reaction between one mole of a dibasic compound and two moles of a hydroxylated high molal amine; the dibasic compound being the esterification product of (A) a polyethylene glycol having at least 7 and not more than 17 ether linkages; and (B) a dibasic carboxy acid having not more than 6 carbon atoms; and the ratio of the esterifying reactants being within the range of more than 1 and not over 2 moles of the dibasic acid for each mole of the glycol; and said hydroxylated high molal amine having at least one hydrocarbon radical containing at least 8 carbon atoms and not more than 26 carbon atoms, and having at least one hydroxylated aliphatic radical; to the extent that such radical contains ether linkages, such ether linkages shall not exceed five, and the alkylene radical of said aliphatic radical containing not over 4 carbon atoms.

6. A process for breaking petroleum emulsions of the water-in-oil type, characterized by subjecting the emulsion to the action of a demulsifying agent, comprising a neutral, water-soluble compound of the following type:

TOOC.D.COO[(C₂H₄O)ₘC₂H₄OOC.D.COO]ₓT in which T is a radical derived by the dehydroxylation of a hydroxylated high molal amine having at least one hydrocarbon radical containing at least 8 carbon atoms and not more than 26 carbon atoms, and having at least one hydroxylatedaliphatic radical; to the extent that such radical contains ether linkages, such ether linkages shall not exceed five, and the alkylene radical of said aliphatic radical containing not over 4 carbon atoms; OOC.D.COO is the acid radical derived from a dibasic acid by removal of the acidic hydrogen atoms; said acid radical having not over 6 carbon atoms; m represents a numeral varying from 7 to 12; and x is a small whole number less than 10.

7. A process for breaking petroleum emulsions of the water-in-oil type, characterized by subjecting the emulsion to the action of a demulsifying agent, comprising a neutral, water-soluble compound of the following type:

TOOC.D.COO(C₂H₄O)ₘC₂H₄OOC.D.COO.T in which T is a radical derived by the dehydroxylation of a hydroxylated high molal amine having at least one hydrocarbon radical containing at least 8 carbon atoms and not more than 26 carbon atoms, and having at least one hydroxylated aliphatic radical; to the extent that such radical contains ether linkages, such ether linkages shall not exceed five, and the alkylene radical of said aliphatic radical containing not over 4 carbon atoms; OOC.D.COO is the acid radical derived from a dibasic acid by removal of the acidic hydrogen atoms; said acid radical having not over 6 carbon atoms; and m represents a numeral varying from 7 to 12.

8. A process for breaking petroleum emulsions of the water-in-oil type, characterized by subjecting the emulsion to the action of a demulsifying agent, comprising a neutral, water-soluble compound of the following type:

TOOC.D.COO(C₂H₄O)ₘC₂H₄OOC.D.COO.T in which T is a radical derived by the dehydroxylation of a hydroxylated high molal amine having at least one hydrocarbon radical containing at least 8 carbon atoms and not more than 26 carbon atoms and having at least one hydroxylated aliphatic radical; to the extent that such radical contains ether linkages, such ether linkages shall not exceed five, and the alkylene radical of said aliphatic radical containing not over 4 carbon atoms; OOC.D.COO is the acid radical derived from maleic acid by removal of the acidic hydrogen atoms; and m represents a numeral varying from 7 to 12.

9. A process for breaking petroleum emulsions of the water-in-oil type, characterized by subjecting the emulsion to the action of a demulsifying agent, comprising a neutral, water-soluble compound of the following type:

TOOC.D.COO(C₂H₄O)ₘC₂H₄OOC.D.COO.T in which T is a radical derived by the dehydroxylation of a hydroxylated high molal amine having at least one hydrocarbon radical containing at least 8 carbon atoms and not more than 26 carbon atoms, and having at least one hydroxylated aliphatic radical; to the extent that such radical contains ether linkages, such ether linkages shall not exceed five, and the alkylene radical of said aliphatic radical containing not over 4 carbon atoms; OOC.D.COO is the acid radical derived from succinic acid by removal of the acidic hydrogen atoms; and m represents a numeral varying from 7 to 12.

10. A process for breaking petroleum emulsions of the water-in-oil type, characterized by subjecting the emulsion to the action of a demulsifying agent, comprising a neutral, water-soluble compound of the following type:

TOOC.D.COO(C₂H₄O)ₘC₂H₄OOC.D.COO.T in which T is a radical derived by the dehydroxylation of a hydroxylated high molal amine having at least one hydrocarbon radical containing at least 8 carbon atoms and not more than 26 carbon atoms, and having at least one hydroxylated aliphatic radical; to the extent that such radical contains ether linkages, such ether linkages shall not exceed five, and the alkylene radical of said aliphatic radical containing not over 4 carbon atoms; OOC.D.COO is the acid radical derived from adipic acid by removal of the acidic hydrogen atoms; and m represents a numeral varying from 7 to 12.

MELVIN DE GROOTE.
BERNHARD KEISER.